(12) United States Patent
Li et al.

(10) Patent No.: US 8,174,934 B2
(45) Date of Patent: May 8, 2012

(54) SOUND DIRECTION DETECTION

(75) Inventors: Hai Li, Harbin Heilongjiang (CN);
Juane Li, Harbin Heilongjiang (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 12/844,839

(22) Filed: Jul. 28, 2010

(65) Prior Publication Data

US 2012/0026837 A1    Feb. 2, 2012

(51) Int. Cl.
*G01S 3/80*    (2006.01)
*H04R 3/00*    (2006.01)

(52) U.S. Cl. ............................. 367/129; 367/124; 381/92

(58) Field of Classification Search .................. 367/118, 367/124, 129
See application file for complete search history.

(56) References Cited

U.S. PATENT DOCUMENTS

| | | | | |
|---|---|---|---|---|
| 3,927,388 A * | 12/1975 | Medrano | ........................ | 367/124 |
| 4,236,040 A * | 11/1980 | Chung | ............................. | 73/646 |
| 4,910,718 A * | 3/1990 | Horn | ............................. | 367/124 |
| 4,982,375 A * | 1/1991 | Ng | ................................ | 367/135 |
| 5,691,959 A * | 11/1997 | Kriewall et al. | ............... | 367/129 |
| 6,690,618 B2 * | 2/2004 | Tomasi et al. | .................. | 367/127 |
| 7,039,198 B2 * | 5/2006 | Birchfield et al. | ............... | 381/92 |
| 7,054,226 B1 * | 5/2006 | Hickling | ........................ | 367/87 |
| 7,952,962 B2 * | 5/2011 | Walley et al. | .................. | 367/124 |

OTHER PUBLICATIONS www.et.byu.edu/groups/ece487web/labs/lab%204.pdf, Mar. 18, 2010.
M. R. Azimi-Sadjadi et al., "Properties of Randomly Distributed Sparse Acoustic Sensors for Ground Vehicle Tracking and Localization", Information System Technologies, Inc., 2006, pp. 1-12, Proc. SPIE 6201.

* cited by examiner

*Primary Examiner* — Ian Lobo
(74) *Attorney, Agent, or Firm* — Ren-Sheng International

(57) ABSTRACT

In accordance with some embodiments of the present disclosure, a process for determining a direction vector of a sound source is described. The process may be implemented to detect, by a first sound sensor, a first sound pressure of a sound wave propagated from the sound source, and detect, by a second sound sensor, a second sound pressure of the sound wave. The process may further be implemented to determine, by a processor, the direction vector of the sound source relative to the first sound sensor and second sound sensor, wherein the direction vector is based on the first sound pressure, the second sound pressure, and a first distance between a first physical location of the first sound sensor and a second physical location of the second sound sensor.

20 Claims, 5 Drawing Sheets

$$p = \exp(-\alpha x)\exp[-i\omega(t-\frac{x}{c_0})]$$

Fig. 2A

$$\Delta P = P_1 - P_2$$
$$\overline{P} = \frac{1}{2}(P_1 + P_2)$$

Fig. 2B

$$\theta = f(\frac{\Delta P}{\overline{P}})$$

Fig. 2C

$$\Delta P = A[\exp(-\alpha r_1) - \exp(-\alpha r_2)]$$
$$\overline{P} = \frac{1}{2}A[\exp(-\alpha r_1) + \exp(-\alpha r_2)]$$

Fig. 2D

$$\frac{\Delta P}{\overline{P}} = \frac{A[\exp(-\alpha r_1) - \exp(-\alpha r_2)]}{\frac{1}{2}A[\exp(-\alpha r_1) + \exp(-\alpha r_2)]} \approx \frac{A[\exp(-\alpha r_1) - \exp(-\alpha r_2)]}{A\exp(-\alpha r_1)}$$

$$\cos\theta \approx \frac{r_2 - r_1}{L}$$

Fig. 2E

$$\frac{\Delta P}{\overline{P}} = \frac{A[\exp(-\alpha r_1) - \exp(-\alpha r_1)\exp(-\alpha L\cos\theta)]}{A\exp(-\alpha r_1)} = 1 - \exp(-\alpha L\cos\theta)$$

Fig. 2F

$$\theta = \arccos\{\frac{1}{\alpha L}\ln[\frac{1}{1-(\frac{\Delta P}{\overline{P}})}]\}$$

Fig. 2G

| Input Value | Output Value |
|---|---|
| Value 1 | Angle 1 |
| Value 2 | Angle 1 |
| Value 3 | Angle 2 |
| Value 4 | Angle 3 |
| ... | ... |
| | |
| | |
| | |
| | |

Lookup
Table 1
(310)

| Input Value A | Input Value B | Output Value |
|---|---|---|
| Value 1 | Front | Angle 1 |
| Value 1 | Behind | Angle 2 |
| Value 2 | Front | Angle 3 |
| Value 3 | Front | Angle 4 |
| ... | ... | ... |
| | | |
| | | |
| | | |
| | | |

Lookup
Table 2
(320)

Fig. 3

SOUND DIRECTION DETECTION

BACKGROUND

Unless otherwise indicated herein, the approaches described in this section are not prior art to the claims in this application and are not admitted to be prior art by inclusion in this section.

Sound travels through solid, liquid or gas medium as an oscillation wave of pressure. Unlike light, sound cannot travel through a vacuum. When a sound has a frequency that is within a specific range and has a sufficiently strong intensity, the vibration that is caused by sound traveling through the medium may be detected by a human or device. The intensity of sound decreases during propagation as the traveling distance increases. Other factors may cause the decrease of the sound intensity include the dissemination of sound waves and the scattering of the sound waves due to obstacles. Also, a part of the acoustic energy of the sound wave may be absorbed by the medium that the sound wave is passing through. This phenomenon is often referred to as acoustic absorption or attenuation. Additional factors, such as viscosity, thermal conduction, or micro-relaxation absorption may also cause attenuation.

The intensity of the sound at a particular location along the sound-wave propagation path may be measured by evaluating the sound pressure that is detected by a sound sensor. The sound sensor may be configured to monitor and measure the characteristics of the sound wave, such as velocity, frequency, and/or phase, and any changes to such characteristics. The sound sensor may generate a signal indicating the amount of sound pressure detected. The sound pressure signal may then be used to further determine the existence and the volume of the sound.

SUMMARY

In accordance with some embodiments of the present disclosure, a method for determining a direction vector of a sound source includes detecting, by a first sound sensor, a first sound pressure of a sound wave propagated from the sound source, detecting, by a second sound sensor, a second sound pressure of the sound wave, and determining, by a processor, the direction vector of the sound source relative to the first sound sensor and the second sound sensor, wherein the direction vector is determined based on the first sound pressure, the second sound pressure, and a first distance between a first physical location of the first sound sensor and a second physical location of the second sound sensor.

In accordance with another embodiment of the present disclosure, a method for determining a direction vector of a sound source includes detecting, by a first sound sensor, a first sound pressure of a sound wave propagated from the sound source, detecting, by a second sound sensor, a second sound pressure of the sound wave, and determining, by a processor, the direction vector of the sound source relative to the first sound sensor and the second sound sensor, wherein the processor utilizes a lookup table to provide the direction vector based on a value derived from the first sound pressure and the second sound pressure.

In accordance with a further embodiment of the present disclosure, a system configured to determine a direction vector of a sound source includes a first sound sensor to detect a first sound pressure of a sound wave propagated from the sound source, a second sound sensor to detect a second sound pressure of the sound wave, and a processor, which is coupled with the first sound sensor and the second sound sensor, to determine the direction vector of the sound source relative to the system based on the first sound pressure and the second sound pressure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 2A-2G show mathematical equations suitable for use in determining sound pressures and direction vectors;

FIG. 3 shows an illustrative embodiment of multiple lookup tables suitable for use in determining a direction vector;

DETAILED DESCRIPTION

Figure 1:
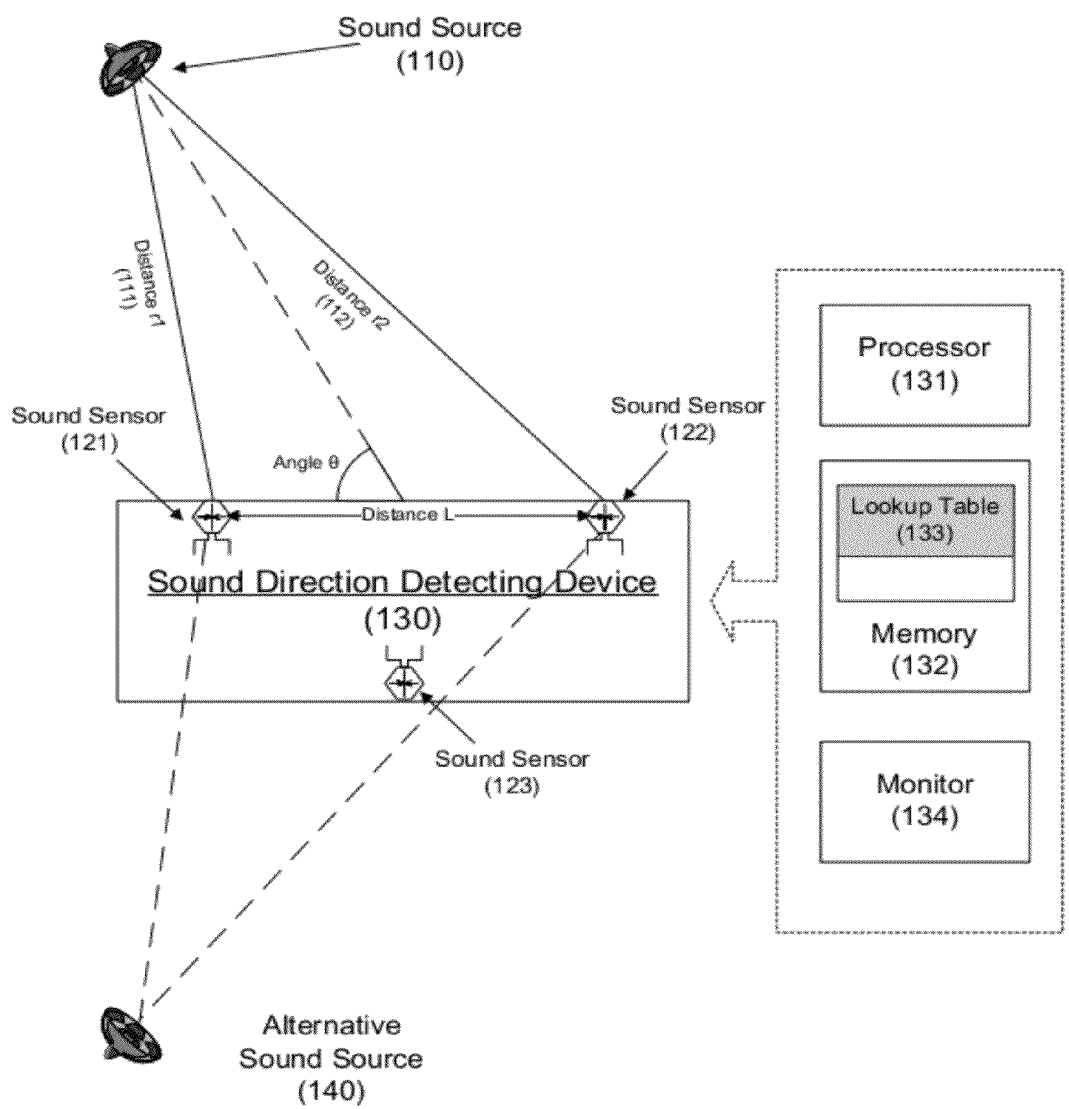
FIG. 1 shows a block diagram of an illustrative embodiment of a sound direction detecting device configured to determine the direction vector of a sound source.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn, inter alia, to methods, apparatus, computer programs and systems related to determining a direction vector of a sound source. Throughout the disclosure, the term "vector" may broadly refer to a position, location, or radius vector which may represent a position of an object in space in relation to a reference point. The term "direction vector" may broadly refer to the direction aspect of a vector, without regard to the length or other aspects of the vector. Since an angle may be sufficient to specify a direction from a reference point to an object in a two-dimensional space, a "two-dimensional direction vector" may be described by an angle coordinate in a two-dimensional coordinate system, without using length, width or other coordinates. Further, a "three-dimensional direction vector" may use two angle coordinates of a spherical coordinate system to specify a direction from a reference point to an object in a three-dimensional coordinate space. For instance, in a three-dimensional coordinate space, an "elevation angle" may specify a first direction from the reference point to the object in a first fixed plane, and an "azimuch angle" may specify a second direction from the reference point to the object in a second fixed plane, the second fixed plane being orthogonal to the first fixed plane.

The term "sound pressure" may broadly refer to a measurement of the pressure generated by a sound wave. A sound sensor may be placed on the sound wave's propagation path to detect the sound wave and output a pressure signal. The pressure signal generated by the sound sensor may be processed and quantified into a measurement (i.e., sound pressure), which may then be compared and/or evaluated to determine the direction vector of the sound source that generated the sound wave.

In at least some embodiments of the present disclosure, a sound direction detecting device may use two sound sensors at different physical positions to detect sound pressures of a sound wave propagated from a sound source. The sound direction detecting device may then use the detected sound pressures to determine a direction vector of the sound source relative to the sound direction detecting device. When the sound wave passes through the two sound sensors in an angle, since the distances from the sound source to the sound sensors may likely not be the same, the sound pressures detected by these two sound sensors may be different due to sound attenuation. The difference between the two detected sound pressures and a distance between the two sound sensors may be used in determining the direction vector of the sound source relative to the sound sensors and/or the sound detecting device.

Some embodiments of the present disclosure may utilize multiple Micro-Electro-Mechanical-Systems (MEMS) sensors to detect sound pressures associated with a sound source and use a processor such as, by way of example and not a limitation, a single-chip processor or a single-chip microcomputer, to determine the two-dimensional direction vector of the sound source. Further, the processor may calculate a value that is derived from two sound pressures and use the derived value to select a direction vector value from a lookup table that is previously generated, without performing complicated data processing. In other embodiments of the present disclosure, a third sound sensor may be employed by the sound direction detecting device and placed in a direction that is opposite to the direction of the first two sound sensors. The sound pressure detected by the third sound sensor may be used to determine whether the sound source is in-front-of or behind the first two sound sensors and to further refine the direction vector.

FIG. 1 shows a block diagram of an illustrative embodiment of a sound direction detecting device 130 configured to determine a direction vector of a sound source. The sound direction detecting device 130 may include, among other things, multiple sound sensors 121, 122 and 123. The sound direction detecting device 130 may also contain a processor 131, a memory 132, and a monitor 134, one or more of which may be internal or external to the sound direction detecting device 130. The sound sensors 121, 122 and 123 may independently detect sound pressures of a sound wave propagated from a sound source 110 and transmit the independently detected sound pressures to the processor 131. The processor 131 may use the received sound pressures to determine a direction vector of the sound source 110 relative to the sound sensors 121, 122, and 123. The memory 132 may contain a lookup table 133 that is suitable for use in efficiently determining the direction vector, and the monitor 134 may be used to display the direction vector and show the direction of the sound source 110 relative to the sound direction detecting device 130 and/or the sound sensors 121, 122, and 123.

In some embodiments, the sound source 110 may be a natural or an artificial sound generator. Examples of natural sounds include, without limitation, human sounds, animal sounds, environmental sounds, etc. In this instance, a natural sound generator may be a human being, an animal, the environment, etc. An example of an artificial sound is a recorded sound, and an artificial sound generator may be a speaker. The sound wave generated from the sound source 110 and propagated toward the sound direction detecting device 130 may have a specific frequency and a certain volume. Further, the sound source 110 may generate sound that has distinguishable characteristics (longitudinal or transverse waves) and physical properties. The characteristics and properties of a sound wave may also be closely related to the transmission medium through which the sound wave travels. Further, the generated sound may be ultrasound that has a frequency greater than the frequency that may be detected by a human, or infrasound that has a frequency lower than the frequency that may be detected by a human.

In some embodiments, the sound sensors 121, 122 and 123 may measure the physical characteristics of the detected sound wave and convert the physical characteristics into analog or digital signals. The sound sensors 121, 122 and 123 may detect the vibration and/or the pressure of the sound wave traveling through the sound sensors. In some embodiments, the sound sensors 121, 122 and 123 may be MSMAS42z-MSMSensing sound sensors that utilize MEMS technology. The MEMS technology may integrate mechanical elements with sensors, actuators and electronics components on a common silicon substrate through micro-fabrication process. This MEMS technology may allow sound sensors to be smaller, more energy efficient, and more portable. Alternatively, any of the variety of types of sound sensors that may sense the sound wave and detect sound pressures may also be used by the sound direction detecting device 130.

In FIG. 1, the sound sensors 121, 122 and/or 123 of the sound direction detecting device 130 may detect the sound wave generated by the sound source 110. In some embodiments, the sound sensors 121 and 122 are installed on one side of the sound direction detecting device 130 and at their respective physical locations. The sound sensor 123 may be positioned at a physical location different from the sound sensors 121 and 122. For example, the sound sensor 123 may be installed on the opposite side of the sound direction detecting device 130. Thus, the sound sensors 121 and 122 may be positioned to face in a first direction. The sound sensor 123 may be positioned to face in a second direction, which differs from the first direction that the sound sensors 121 and 122 face in.

In some embodiments, because the sound direction detecting device 130 may detect the sound wave propagated from the sound source 110 in any angle, a distance 111 between the sound sensor 121 and the sound source 110 may be different from a distance 112 between the sound sensor 122 and the sound source 110. Since the intensity of sound decreases as the distance of propagation increases, the sound pressure detected by the sound sensor 121 is likely to be different from the pressure detected by the sound sensor 122. On the other hand, if the sound pressures detected by the two sound sensors 121 and 122 are substantially identical (same), then the distance 111 and the distance 112 may substantially be the same. In such a situation, the direction vector of the sound source may be close to 90 degrees. If the sound wave is not reflected, for example, from some surface, the sound pressures detected from the different sound sensors may be used to show a direction of the sound source 110 relative to the sound direction detecting device 130.

According to some embodiments of the present disclosure, the sound sensors 121 and 122 of the sound direction detecting device 130 may detect the sound wave propagated from an alternative sound source 140, which is different from the sound source 110. The sound sensor 121 may have substantially the same distance to the sound source 110 as to the sound source 140, and the sound sensor 122 may have substantially the same distance to the sound source 110 as to the sound source 140. Stated differently, the sound sensor 121 may be positioned or located substantially the same distance from the sound source 110 as from the sound source 140, and the sound sensor 122 may be positioned or located substantially the same distance from the sound source 110 as from the sound source 140. In this case, the sound direction detecting device 130 may have difficulty determining whether the direction of the sound wave is from the sound source 110 or the sound source 140 if it utilizes the sound pressures detected by the sound sensors 121 and 122 to determine the direction of the sound wave. Thus, in a two-dimensional space, two sound sensors may be used to determine a direction vector with approximately 180-degree accuracy. That is, the sound direction detecting device 130 may accurately describe, in angle degrees, whether a sound source is from the left side of, the right side of, or the middle area between the sound sensors 121 and 122 in a 180-degree range. However, the sound direction detecting device 130 may not be able to determine whether the sound source 110 is in-front-of or behind the sound sensors 121 and 122.

According to some embodiments of the present disclosure, a third sound sensor 123 may be installed in the sound direction detecting device 130 at a fixed position and on a side of the sound direction detecting device 130 that is different from the side of the sound direction detecting device 130 that the sound sensors 121 and 122 are located on. The sound pressure detected by the third sound sensor 123 may then be used to compare with the pressures detected by the sound sensors 121 and 122 in order to determine whether the sound source is in-front-of or behind the sound sensors 121 and 122. For example, in FIG. 1, the sound sensor 123 may be placed at a position in between the positions of the sound sensors 121 and 122. At the same time, the sound sensor 123 may be placed on a side of the sound direction detecting device 130 that is opposite to the side of the sound direction detecting device 130 on which the sound sensors 121 and 122 are placed. During operation, the distance between the sound source 110 and the sound sensor 123 is different from the distance 111 and distance 112. Thus, if the sound pressure detected by the sound sensor 123 is weaker than the pressures detected by the sound sensors 121 and/or 122, it may be reasoned that the sound wave should be from the sound source 110, which is in front of the sound sensors 121 and 122 and has a shorter distance to the sound sensors 121 and 122 than to the sound sensor 123. Similarly, when the sound pressure detected by the sound sensor 123 is stronger than the pressures detected by the sound sensors 121 and/or 122, the sound direction detecting device 130 may determine that the distance from the sound source to the sound sensor 123 is shorter than to the sound sensors 121 and 122. In this case, the sound should be originated from the sound source 140, which is behind the sound sensors 121 and 122. Thus, by using three acoustic sound sensors 121, 122 and 123, the sound direction detecting device 130 may divide a two-dimensional plane, into four substantially same-sized quadrants (front left, front right, behind left, and behind right) from the perspective of the sound direction detecting device 130, and may determine a two-dimensional direction vector in a 360-degree range.

In some embodiments, a two-dimensional direction vector, which is represented by an angle θ in FIG. 1, may be used to represent the direction of the sound source 110 in relation to the sound direction detecting device 130. Furthermore, the angle θ may be determined by processing the sound pressures obtained from the sound sensors 121, 122 and/or 123, without using the distance between the sound source 110 and the sound direction detecting device 130. In some embodiments as illustrated in FIG. 1, the angle θ, which is the angle formed by a line connecting the two sound sensors 121 & 122 and a line from the sound source 110 to an imaginary point between the two sound sensors 121 and 122, is deemed to represent the direction vector of the sound source 110 in relation to the sound direction detecting device 130. Alternatively, the angle θ may also be formed based on a line from an imaginary center of the sound direction detecting device 130 to the sound source 110 and the line connecting the two sound sensors 121 and 122.

In some embodiments, by deriving the angle θ from the sound pressures detected by the sound sensors 121 and 122, the distances 111 and 112, which are measured from the sound source 110 to the sound sensors 121 and 122 respectively, become irrelevant. To accomplish this, the sound direction detecting device 130 may employ the processor 131 to evaluate the sound pressures continuously detected by the sound sensors 121, 122 and 123, select samples from the detected sound pressures based on some triggering criteria, and determine a direction vector based on the selected sound pressure samples. Further, the processor 131 may utilize a lookup table 133, which may be managed by the processor 131 or stored in the memory 132, for fast determination of the direction vector. The direction vector may then be displayed on the monitor 134 to visually indicate the direction of the sound source 110 in relation to the sound direction detecting device 130. The details of the sound pressure processing and direction vector determination are further described below.

According to some embodiments of the present disclosure, the processor 131, the memory 132, and the monitor 134 may be integrated into the sound direction detecting device 130, along with the sound sensors 121, 122 and 123. The sound direction detecting device 130 may be implemented as a portable device or as a component of a portable device such as a mobile phone, a personal data assistant (PDA), a personal media player device, a wireless web-watch device, a personal headset device, an application specific device, or a hybrid device that includes any of the above functions. The sound direction detecting device 130 may also be implemented using a personal computer including both laptop computer and non-laptop computer configurations. In one alternative embodiment, the processor 131, the memory 132, and/or the monitor 134 may be external to the sound direction detecting device 130. In such a case, these external components may be provided by a separate computing system coupled with the sound direction detecting device 130 to perform similar functions as discussed above. In yet another alternative embodiment, one or all of the sound sensors 121, 122 and 123 may be external to the sound direction detecting device 130 for detecting sound pressures.

FIGS. 2A-2G show mathematical equations suitable for use in determining sound pressures and direction vectors, in accordance with at least some embodiments of the present disclosure. In FIGS. 2A-2G, various equations are listed to illustrate how a direction vector may be derived from sound pressures detected from two sound sensors. When the medium absorption of the sound wave is not significant, a sound pressure at a specific location may be described by an equation of FIG. 2A. In FIG. 2A, p is the sound pressure in a measurement unit of N/m2. The variable $c_0$ represents the speed of sound transmitting through a particular medium. When the particular medium is fixed, the variable $c_0$ is a constant under a controlled environment. The variable ω represents an angular frequency of the sound. And α, which represents attenuation coefficient that determines the speed of sound decay, may also be a constant under the controlled environment.

In the equation shown in FIG. 2A, the distance traveled by the sound wave is represented by variable x. Thus, the equation of FIG. 2A reflects a phenomenon in which the amplitude of sound decreases exponentially with the increase of the distance x. Such phenomenon may be a result of viscosity. Thus, as long as the absorption medium is not significant in affecting the sound wave propagation, the acoustic characteristics of the sound, represented by sound pressure in FIG. 2A, may be adequately represented by the equation of FIG. 2A. Further, the constant α may be adjusted to reflect the different scenarios of sound absorption or the different types of mediums.

In one scenario described in FIG. 1, two acoustic sound sensors 121 and 122 are placed at two different locations. When sound wave generated from the sound source 110 is propagated to the sound sensors 121 and 122, the sound sensors 121 and 122 generate two measurements of sound pressure: p1 and p2. Accordingly, the relationship between the direction vector's angle and the p1 and p2 may be derived based on the equation of FIG. 2A. In some embodiments, FIG. 2B describes two values derived from p1 and p2. One value Δp, which represents a difference of the sound pressures p1 and p2, may be calculated by subtracting the lower value of p1 and p2 from the higher value of the p1 and p2. The other value $\bar{p}$, which describes an average of the sound pressures p1 and p2, may be computed by dividing the sum of the two values p1 and p2 by 2. Thus, finding a relationship between the angle θ and the sound pressures p1 and p2 becomes a task to find an equation in the form of FIG. 2C.

In one scenario, the equation of FIG. 2A may be inputted into the equations of FIG. 2B. For illustrational purpose, the equation of FIG. 2A may be simplified to $$A[\exp(-\alpha r)],$$

in which A and α are constants, and r represents the distance from the sound source to the sound sensor. As a result, the equation in FIG. 2D is the outcome of inputting equation of FIG. 2A into the equation of FIG. 2B. In FIG. 2D, r1 describes the distance between the sound source 110 and the sound sensor 121, and r2 describes the distance from the sound source 110 to the sound sensor 122. Since in most cases the distances between the sound source and the sound sensors are much greater than a distance L (illustrated in FIG. 1) between the two sensors 121 and 122, the incidental sound waves may be approximated as plane waves, and the equations in FIG. 2C and FIG. 2D may be approximated to the first equation of FIG. 2E.

In one scenario, the cosine of angle θ may be approximately calculated by dividing the difference of r1, r2 with the distance L, as illustrated in the second equations of FIG. 2E. By further deducing the equations based on FIG. 2F, the equation in FIG. 2F eliminates the variables r1 and r2. Thus, the angle θ may be calculated based on the source pressures p1, p2 and the distance L, as illustrated in the equation of FIG. 2G. Since the function "arccos" may provide an output ranging from 0 degree to 180 degree, the equation of FIG. 2G is consistent with the previous analysis that two sound sensors may only determine a two-dimensional direction vector with a 180-degree range, and may not differentiate whether the sound source is in-front-of or behind the sound sensors. Thus, the output generated from the equation of FIG. 2G may be further refined by analyzing the sound pressure detected via a third sensor in order to provide a direction vector that has a 360-degree range.

FIG. 3 shows illustrative embodiments of multiple lookup tables suitable for use in determining a direction vector. A lookup table is a data structure that stores an array of indexed data. By using a lookup table, a process to calculate an output value from a set of input values according to a specific equation may be replaced by a search of the lookup table using an index generated from the input values. Before processing, the lookup table may be pre-populated with all possible input values and/or output values. For example, for a lookup table having an accuracy of one-degree and a range of 180 degrees, 180 output values would be sufficient to cover all possible direction vector values. During lookup table population, one or a set of input values are calculated based on a process or equation to generate an output value. The generated output value may be paired with the input value(s) and stored in the lookup table. The input values and output values may be paired and stored, and the lookup table may be indexed based on the input value. Later, when a particular input value(s) is received, the data pair which is indexed based on the input values(s) may be quickly retrieved from the lookup table, and the output value may be directly obtained from the data pair without performing any complicated computation.

In FIG. 3, a lookup table 310 (Table 1) may contain multiple rows of data, each row having an input value and a corresponding output value forming a data pair. In some embodiments, the input values of the lookup table 310 may be values derived from a formula (e.g., $\Delta p/\bar{p}$), and the corresponding output values are direction vectors in angles that are generated based on the input values and the equation of FIG. 2G. In some embodiments, the lookup table 310 may be pre-populated to contain data pairs covering all possible output values. During operation, a processor may first calculate an input value based on two sound pressure value p1 and p2 and the formula $\Delta p/\bar{p}$. The calculated value may then be used as an index to search for a corresponding data pair. Once a corresponding data pair is located in the lookup table, the output value may be directly retrieved from the data pair as a direction vector, without having to perform a complicated calculation that involves multiplications, divisions, log( ) calculations and arccos( ) calculations.

In some embodiments, the lookup table may contain multiple input variables that have the same output value. This situation may be related to the nature of the formula used to generate the output values or caused by a predetermined accuracy rate. Taking the example of the lookup table 310 in FIG. 3, assuming this lookup table stores output values that are accurate to one-degree, then each output value generated may need to be rounded to a closest full degree value. Thus, different input values "Value 1" and "Value 2" may have a common output value of "Angle 1", and be associated with this output value as two data pairs in the lookup table. Also, the accuracy of the output value may be improved by increasing the amount of data pairs in the lookup table. For example, when the accuracy rate is increased to half-degree, outputs for the different input values, which are used to be rounded to the same value, may be rounded to different values, and the possibility that different input values may be associated with the same output value may be decreased. Alternatively, different input values may also be rounded to an input value that is present in the lookup table during output value lookup. For example, if a particular input value does not have an output value paired in the lookup table, then a closest input value having a paired output value may be used to substitute the input value.

In some embodiments, a lookup table 320 (Table 2) contains two columns for storing input values and one column for the output value. For example, the "input value A" column may store a value derived from the formula $\Delta p / \bar{p}$. And the "input value B" column may store a value that is derived from a determination based on sound pressure detected from a third sound sensor 123, indicating whether the sound source 110 is in-front-of or behind two sound sensors 121 and 122. In this case, when input value A "Value 1" is paired with input value B "front", the output value is different from the output value derived from the "Value 1" pairing with a "back" input value B. Thus, by having two input values, the lookup table 320 may provide direction vectors in 360-degree range. Alternatively, the "input value A" column may be used to store p1, and the "input value B" column may be used to store p2. In this case, the calculation of the $\Delta p$ and $\bar{p}$, and the division of $\Delta p$ with $\bar{p}$ may be pre-performed during lookup table population. During operation, the $\Delta p$ and $\bar{p}$ calculations are eliminated to improve the performance of data processing, save energy and reduce device complication. Alternatively, a lookup table may also have multiple output value columns for a calculation with multiple outputs. Thus, by substituting complicated operations with a lookup table, the sound direction detecting device 130 may reduce the data processing components into a single-chip microcomputer and simplify the associated peripheral requirements.

Figure 4:
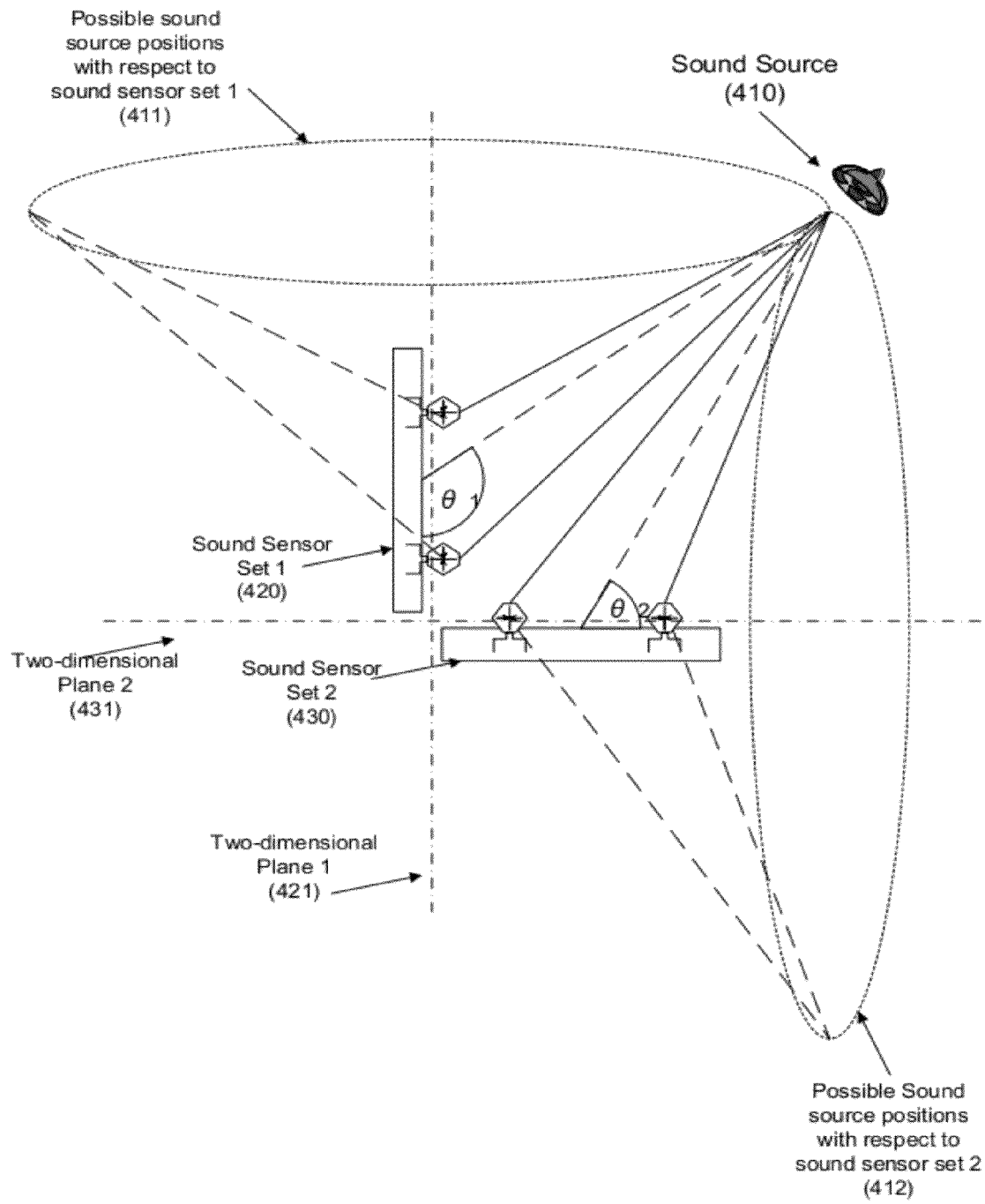
FIG. 4 shows a block diagram of an illustrative embodiment of a system with multiple sets of sound sensors to determine three-dimensional direction vector of a sound source.

FIG. 4 shows a block diagram of an illustrative embodiment of a system with multiple sets of sound sensors to determine three-dimensional direction vector of a sound source. In FIG. 4, a sound direction detecting device (not shown in FIG. 4) contains two sets of sound sensors 420 and 430 positioned orthogonal of each other. Each of the sound sensor sets 420 and 430 may be constructed based on the sound sensor configuration in FIG. 1. For example, the sound sensor set 420 (Set 1) may have two sound sensors facing right with a third sensor (not shown in FIG. 4) facing left. And the sound sensor set 430 (Set 2) may have two sensors facing up and the third sensor (not shown in FIG. 4) facing down. A sound source 410 may produce a sound wave that may be detected by all the sound sensors in FIG. 4.

In some embodiments, each of the sound sensor sets 420 and 430 may be used for determining a respective two-dimensional direction vector of the sound source 410. Therefore, the sound sensor set 420 may be used to determine a two-dimensional direction vector in a two-dimensional plane 421, and the sound sensor set 430 may be used to determine another two-dimensional direction vector in a two-dimensional plane 431. The front two sensors of the sound sensor set 420 may form the two-dimensional plane 421, meaning these two sensors may be located in the two-dimensional plane 421. The front two sensors of the sound sensor set 430 may form the two-dimensional plane 431, meaning these two sensors may be located in the two-dimensional plane 431. In some embodiments, the plane 421 may be orthogonal to the plane 431 to form a three-dimensional coordinate space.

In FIG. 4, which illustrates a three-dimensional space, both plane 421 and 431 are orthogonal to the two-dimensional plane the FIG. 4 is drawn on. In such a three-dimensional coordinate space, the possible positions of the sound source 410 may form a circle with respect to one sound sensor set. That is, any point on the sound sensor circle 411 may be a possible position for the sound source 410 relative to the sound sensor set 420, since each of these points has the same distances to the two sensors of the sound sensor set 420. Likewise, the sound sensor circle 412 represents all possible positions for the sound source 410 with respect to sound sensor set 430. When each of the sound sets 420 and 430 uses a third sensor to further distinguish the sound source, the sound source circles 411 and 412 become half circles (divided by the plane 421 and 431, respectively), as the third sensor may determine whether the sound source is in front of or behind the first two sensors. In order to generate a three-dimensional direction vector, a single set of sound sensors 420 or 430 may be insufficient in pinpointing the direction of the sound source 410 in a three-dimensional space.

In some embodiments, sound pressures from the sound sensor sets 420 and 430 may be processed by a processor to generate a three-dimensional direction vector pinpointing the location of the sound source 410 in a three-dimensional coordinate space. That is, the two angle values θ 1 and θ 2, which may be generated based on the sound pressures detected by the two sensor sets 420 and 430, may be sufficient in describing the three-dimensional direction vector of the sound source. As illustrated in FIG. 4, the actual location of the sound source 410 may be at the intersection of the two circles 411 and 412. By orthogonally placing one sound sensor set 420 next to the other sound sensor set 430, the two-dimensional planes 421 and 431, in which the two sensor sets are located, become orthogonal to each other. Thus, the angle value θ 1, which is in plane 421 and is generated from the sound pressures detected by the sound sensor set 420, and the angle value θ 2, which is in plane 431 and is generated based on the sound pressures detected by the sound sensor set 430, may be deemed as the elevation angle and the azimuch angle of a three-dimensional direction vector. Afterward, the two angle values θ 1 and θ 2 of the three-dimensional direction vector may then be rendered into a three-dimensional coordinate space and displayed in a monitor.

In some embodiments, to further reduce the number of sound sensors necessary for determining a three-dimensional direction vector, a sound sensor from one of the sound sensor sets 420 and 430 may be utilized as a third sensor for the other sensor set. That is, one sensor set may use the sound pressure detected by a sensor from the other sensor set in determining a two-dimensional direction vector with a 360-degree angle range. Thus, four sound sensors may be sufficient in determining three-dimensional direction vector of a sound source. Further, the direction vector processing may also be performed by utilizing a lookup table. In this case, the lookup table may pair two angle outputs with four sound pressure inputs. And the sound pressure values from the four sensors of sensor sets 420 and 430 may be used to find the two corresponding angle values. Thus, a lookup table may greatly improve the performance of the processor in determining a three-dimensional direction vector.

Figure 5:
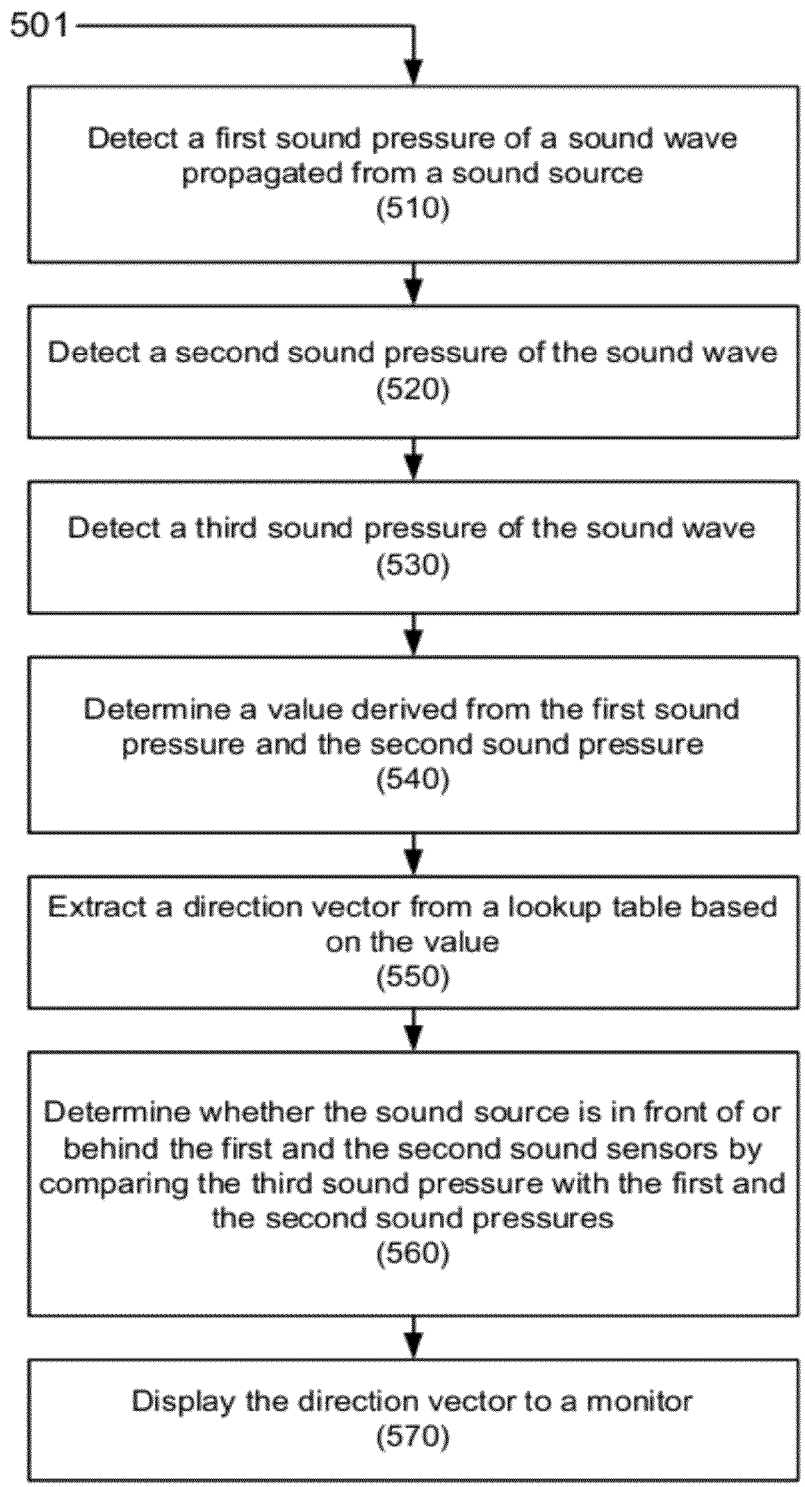
FIG. 5 shows a flow diagram of an illustrative embodiment of a process for detecting sound pressures of a sound source and determining the sound source's direction vector.

FIG. 5 is a flow diagram of an illustrative embodiment of a process 501 for detecting sound pressures of a sound source and determining the sound source's direction vector. The process 501 may be performed by processing logic that may include hardware (e.g., special-purpose circuitry, dedicated hardware logic, programmable hardware logic, etc.), software (such as instructions that may be executed on a processing device), firmware or a combination thereof. In some embodiments, machine-executable instructions for the process 501 may be stored in memory 132 of FIG. 1, executed by the processor 131 and/or implemented in the sound direction detecting device 130 of FIG. 1.

Process 501 may begin at block 510, "detect a first sound pressure of a sound wave propagated from a sound source." Block 510 may be followed by block 520, "detect a second sound pressure of the sound wave." Block 520 may be followed by block 530, "detect a third sound pressure of the sound wave." Block 530 may be followed by block 540, "determine a value derived from the first sound pressure and the second sound pressure." Block 540 may be following by block 550, "extract a direction vector from a lookup table based on the value." The block 550 may be followed by block 560, "determine whether the sound source is in-front-of or behind the first and the second sound sensors by comparing the third sound pressure with the first and the second sound pressures." And the block 560 may be followed by block 570, "display the direction vector to a monitor."

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 510, a sound direction detecting device may detect a first sound pressure of a sound wave propagated from a sound source. In an example implementation, the sound direction detecting device may use a first sound sensor to detect the first sound pressure. The first sound sensor may be instructed by a processor of the sound direction detecting device to detect sound pressures, and may be any sensor that may detect a first pressure of a sound wave propagated from a remote sound source. The sound sensor may convert the pressure of the sound wave into analog or digital signals representing sound pressures. In some embodiments, if the sound pressure detected by the sound sensor is in an analog format, then an 8-bit analog-to-digital (A/D) converter may be used to transfer the analog signal to a digital signal. During conversion, the 8-bit A/D converter may sample the continuous analog signals and translate the signal into discrete digital numbers. The digital numbers may be deemed digitalized sound pressure for further processing.

At block 520, the sound direction detecting device may detect a second sound pressure of the same sound wave propagated from the sound source. In one example implementation, the sound direction detecting device may use a second sound sensor to detect the second sound pressure. The second sound sensor may be similar to the first sound sensor, and may face the same direction as the first sound sensor. At block 530, the sound direction detecting device may use a third sound sensor to detect a third sound pressure of the sound wave. In some embodiments, the third sound sensor may be optional or may be replaced by a sound sensor from a different sound sensor set. The first, second, and the optionally third sound pressures detected by the sound sensors may then be transmitted to the processor of the sound direction detecting device for further processing, as described below.

At block 540, a processor of the sound direction detecting device may process the sound pressures previously detected, and derive a value from the first sound pressure and the second sound pressure. In some embodiments, the processor may process the signals provided by the sound sensors based on certain criteria, in order to ensure that the measurements of the sound pressures, detected by the different sound sensors at different time, may be meaningfully evaluated. For example, since the sound wave passes through different sound sensors at different times, the sound pressures detected by the multiple sound sensors may need to be correlated in order to compensate for the transmission delays. Also, since the sound wave may be continuous, the sound pressures detected by a single sensor may fluctuate throughout time. In some embodiments, the processor may select a highest-volume sample from a set of the sound pressures detected by a sound sensor within a pre-determined time interval. Since within a pre-determined time interval, the highest-volume samples detected by all the sound sensors may be the result of the same sound wave, these highest-volume samples may be sufficient to compensate the time delays and represent the sound pressures detected by the sound sensors. Thus, the highest-volume may be one of the criteria that may be used during sound pressure detections.

Alternatively, the processor may use a specific frequency as a criterion for selecting signal samples. Further, the processor may utilize a combination of sound volume and sound frequency criteria in identifying the signal samples that represent sound pressures. Hence, the above approaches ensure that the sound pressure signals detected by the different sound sensors may be meaningfully compared and processed. In some embodiments, the first sound pressure value and the second sound pressure value detected by the first and the second sound sensors may then be utilized by the processor to calculate a pressure difference value $\Delta p$ and an average pressure value $\bar{p}$. The processor may further divide the pressure difference value $\Delta p$ with the average pressure value $\bar{p}$ to generate a specific value that may be used in an equation as illustrated in FIG. 2G. Thus, the processor may determine a value that is derived from the first sound pressure and the second sound pressure.

In some embodiments, at block 550, the processor of the sound direction detecting device may use the value generated at block 540 to extract a direction vector, represented by one or more angle values, from a lookup table. The lookup table may contain pairs of data that are previously generated based on the equation of FIG. 2G. During data generation, the distance between the first sound sensor and the second sound sensor and the $\Delta p/\bar{p}$ values are used as input values to the equation of FIG. 2G. The $\Delta p/\bar{p}$ input values are then paired with their corresponding output values as data pairs for the lookup table. In this case, the value generated at block 540 may be used as an index to extract output value(s) from the lookup table. The output value(s), which may be one or more angle values, may be deemed a direction vector of the sound source.

At block 560, the processor of the sound direction detecting device may further compare the third sound pressure with the first and the second sound pressures to determine whether the sound source is in-front-of or behind the first and the second sound sensors. In some embodiments, the third sound sensor may face a direction that is opposite to the direction the first and the second sensors face. When the third sound pressure is lower than either the first or the second sound pressures, the processor may determine that the sound source is in front of the first sound sensor or the second sound sensor. If the third sound pressure is higher than the first or the second sound pressure, then the sound source may be behind the first and the second sound sensors. Such determination may also be integrated into the lookup table to provide a direction vector that has a 360-degree range.

At block 570, the processor of the sound direction detecting device may display the direction vector to a monitor for visual inspection. In some embodiments, the direction vector may be displayed as an arrow pointing to the direction of the sound source from the first sound sensor and the second sound sensor. Specifically, the first sound sensor and the second sound sensor may be integrated into a point being positioned at a central place on the monitor, and the direction vector may be drawn from the central place to the direction of the sound source. The length of the arrow may be encoded to show the strength of the sound pressure received at the sound sensors. Thus, the higher the sound pressure detected by the sound sensors, the longer the arrow may be displayed on the monitor. Also, additional information, such as the east-west, north-south orientations, may also be displayed on the monitor. Further, the direction vector may also be supplied to other applications, such as GPS or map applications, to provide an integrated solution for sound direction detection.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or a firmware configuration; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein can be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of the skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact, many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for determining a direction vector of a sound source, comprising:
    detecting, by a first sound sensor, a first sound pressure of a sound wave propagated from the sound source;
    detecting, by a second sound sensor, a second sound pressure of the sound wave; and
    determining, by a processor, the direction vector of the sound source relative to the first sound sensor and the second sound sensor, wherein the direction vector is determined based on a difference of the first sound pressure and the second sound pressure, an average of the first sound pressure and the second sound pressure, and a first distance between a first physical location of the first sound sensor and a second physical location of the second sound sensor.

2. The method of claim 1, further comprising:
    displaying, by the processor, the direction vector on a monitor, wherein the direction vector is displayed as a direction to the sound source from the first sound sensor and the second sound sensor.

3. The method of claim 1, further comprising:
    detecting, by a third sound sensor, a third sound pressure of the sound wave, wherein the direction vector is further determined by comparing the third sound pressure with the first sound pressure and the second sound pressure.

4. The method of claim 1, wherein
    the detecting the first sound pressure comprises selecting the first sound pressure from the first sound sensor's outputs within a pre-determined time interval, and the detecting the second sound pressure comprises selecting the second sound pressure from the second sound sensor's outputs within the pre-determined time interval, and the first sound pressure and the second sound pressure are selected based on a criterion.

5. The method of claim 1, wherein the first sound sensor and the second sound sensor are Micro-Electro-Mechanical Systems (MEMS) sensors.

6. The method of claim 1, wherein the determining the direction vector comprises utilizing a lookup table to provide the direction vector.

7. The method of claim 1, wherein the determining the direction vector is not based on a second distance between the sound source and the first sound sensor or a third distance between the sound source and the second sound sensor.

8. The method of claim 1, wherein the direction vector is represented in a two-dimensional sound collection plane in which the first sound sensor and the second sound sensor are located.

9. The method of claim 1, further comprising:
    detecting, by a third sound sensor, a third sound pressure of the sound wave;
    detecting, by a fourth sound sensor, a fourth sound pressure of the sound wave; and
    determining, by the processor, a three-dimensional direction vector of the sound source based on the first sound pressure, the second sound pressure, the third sound pressure, and the fourth sound pressure, wherein the three-dimensional direction vector is represented in a three-dimensional coordinate space formed based on a first sound collection plane, in which the first sound sensor and the second sound sensor are located, and a second sound collection plane, in which the third sound sensor and the fourth sound sensor are located.

10. The method of claim 9, wherein the first sound collection plane and the second sound collection plane are orthogonal to each other to form the three-dimensional coordinate space.

11. A method for determining a direction vector of a sound source, comprising:
    detecting, by a first sound sensor, a first sound pressure of a sound wave propagated from the sound source;
    detecting, by a second sound sensor, a second sound pressure of the sound wave; and
    determining, by a processor, the direction vector of the sound source relative to the first sound sensor and the second sound sensor, wherein the processor utilizes a lookup table to provide the direction vector based on a value derived from the first sound pressure and the second sound pressure, and the lookup table is generated based on a difference of the first sound pressure and the second sound pressure, an average of the first sound pressure and the second sound pressure, and a first distance between a first physical location of the first sound sensor and a second physical location of the second sound sensor.

12. The method of claim 11, wherein
    the detecting the first sound pressure comprises selecting the first sound pressure from the first sound sensor's outputs within a pre-determined time interval, and further wherein
    the detecting the second sound pressure comprises selecting the second sound pressure from the second sound sensor's outputs within the pre-determined time interval, and the first sound pressure and the second sound pressure are selected based on a criterion.

13. The method of claim 11, further comprising:
detecting, by a third sound sensor, a third sound pressure of the sound wave; and
determining, by the processor, the direction vector in a 360-degree two-dimensional plane by comparing the third sound pressure with the first sound pressure and the second sound pressure.

14. The method of claim 11, further comprising:
determining, by the processor, the direction vector without using a second distance between the sound source and the first physical location or a third distance between the sound source and the second physical location.

15. A system configured to determine a direction vector of a sound source, comprising:
a first sound sensor to detect a first sound pressure of a sound wave propagated from the sound source;
a second sound sensor to detect a second sound pressure of the sound wave; and
a processor coupled with the first sound sensor and the second sound sensor, the processor to determine the direction vector of the sound source relative to the system based on a difference of the first sound pressure and the second sound pressure, an average of the first sound pressure and the second sound pressure, and a first distance between a first physical location of the first sound sensor and a second physical location of the second sound sensor.

16. The system of claim 15, further comprising a monitor coupled with the processor to display the direction vector.

17. The system of claim 15, wherein the first sound sensor and the second sound sensor are Micro-Electro-Mechanical Systems (MEMS) sensors.

18. The system of claim 15, wherein the processor is configured to locate the direction vector from a lookup table based on a value derived from the first sound pressure and the second sound pressure.

19. The system of claim 15, further comprising:
a third sound sensor to detect a third sound pressure from the sound wave, wherein the first sound sensor and the second sound sensor face a first direction, and third sound sensor faces a second direction opposite to the first direction.

20. The system of claim 19, wherein the processor determines whether the sound source is in-front-of or behind the first sound sensor and the second sound sensor by comparing the third sound pressure with the first sound pressure and the second sound pressure.

* * * * *